(12) United States Patent
Kaiser

(10) Patent No.: US 7,448,201 B2
(45) Date of Patent: Nov. 11, 2008

(54) HONEYCOMB BODY AND METHOD FOR TREATING A FLUID

(75) Inventor: Friedrich-Wilhelm Kaiser, Neukirchen-Seelscheid (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 11/178,704

(22) Filed: Jul. 11, 2005

(65) Prior Publication Data
US 2005/0268788 A1    Dec. 8, 2005

Related U.S. Application Data

(63) Continuation of application No. PCT/EP03/13746, filed on Dec. 5, 2003.

(30) Foreign Application Priority Data

Jan. 9, 2003    (DE) .............................. 103 00 408

(51) Int. Cl.
*F01N 3/00*    (2006.01)
(52) U.S. Cl. .............................. 60/276; 60/274; 60/285; 60/295
(58) Field of Classification Search .................. 60/274, 60/276, 285, 286, 295, 297, 303
See application file for complete search history.

(56) References Cited

U.S. PATENT DOCUMENTS

| | | | |
|---|---|---|---|
| 4,273,681 A | 6/1981 | Nonnenmann | |
| 4,832,998 A | 5/1989 | Cyron | |
| 4,912,926 A * | 4/1990 | Kumagai et al. | 60/276 |
| 4,923,109 A | 5/1990 | Cyron | |
| 5,045,403 A | 9/1991 | Maus et al. | |
| 5,095,878 A * | 3/1992 | Kumagai et al. | 60/276 |
| 5,105,539 A | 4/1992 | Maus et al. | |
| 5,119,629 A * | 6/1992 | Kume et al. | 60/274 |
| 5,130,208 A | 7/1992 | Maus et al. | |
| 5,139,844 A | 8/1992 | Maus et al. | |
| 5,157,010 A | 10/1992 | Maus et al. | |
| 5,455,012 A * | 10/1995 | Machida et al. | 422/180 |
| 5,474,746 A | 12/1995 | Maus et al. | |

(Continued)

FOREIGN PATENT DOCUMENTS

DE    29 02 779 A1    7/1980

(Continued)

*Primary Examiner*—Tu M Nguyen
(74) *Attorney, Agent, or Firm*—Laurence A. Greenberg; Werner H. Stemer; Ralph E. Locher

(57) ABSTRACT

A honeycomb body, in particular for aftertreatment of exhaust gas from an internal combustion engine, includes an inlet surface, an outlet surface and a honeycomb structure through which a fluid can flow. The honeycomb structure is disposed between the inlet surface and the outlet surface. The honeycomb structure has a storage device for storing at least one component of the fluid. A measurement sensor measures a concentration of the component in the fluid. The measurement sensor is disposed in the honeycomb structure at a given minimum distance from the outlet surface. A method for treating a fluid with the honeycomb body is also provided. The honeycomb body and method advantageously enable components of the fluid, e.g. nitrogen oxides ($NO_x$), to be stored and reliably prevent the component which is to be stored from breaking through.

22 Claims, 2 Drawing Sheets

U.S. PATENT DOCUMENTS

| | | | |
|---|---|---|---|
| 5,750,082 A * | 5/1998 | Hepburn et al. | 423/213.5 |
| 5,983,627 A * | 11/1999 | Asik | 60/274 |
| 6,167,696 B1 * | 1/2001 | Maaseidvaag et al. | 60/274 |
| 6,190,784 B1 | 2/2001 | Maus et al. | |
| 6,408,619 B1 * | 6/2002 | Wissler et al. | 60/286 |
| 6,453,662 B1 * | 9/2002 | Lewis et al. | 60/277 |
| 6,497,093 B1 * | 12/2002 | Lewis et al. | 60/277 |
| 6,502,389 B2 * | 1/2003 | Katayama et al. | 60/285 |
| 6,539,706 B2 * | 4/2003 | Farmer et al. | 60/285 |
| 6,629,409 B2 * | 10/2003 | Lewis et al. | 60/285 |
| 6,694,724 B2 * | 2/2004 | Tanaka et al. | 60/274 |
| 6,854,263 B1 | 2/2005 | Brück et al. | |
| 6,860,101 B2 * | 3/2005 | Kako et al. | 60/285 |
| 6,865,879 B2 * | 3/2005 | Posselt et al. | 60/276 |
| 6,941,746 B2 * | 9/2005 | Tarabulski et al. | 60/286 |
| 6,996,975 B2 * | 2/2006 | Radhamohan et al. | 60/286 |
| 7,076,943 B2 * | 7/2006 | Lewis et al. | 60/285 |
| 7,114,325 B2 * | 10/2006 | Surnilla et al. | 60/276 |
| 2002/0076364 A1 | 6/2002 | Bruck | |
| 2004/0074094 A1 | 4/2004 | Bruck | |

FOREIGN PATENT DOCUMENTS

| | | |
|---|---|---|
| DE | 38 21 345 A1 | 6/1988 |
| DE | 88 16 154.4 | 12/1988 |
| DE | 41 29 893 A1 | 3/1993 |
| DE | 199 24 861 C1 | 10/2000 |
| DE | 102 37 512 C1 | 8/2002 |
| DE | 102 42 302 A1 | 9/2002 |
| EP | 0 245 737 A1 | 5/1987 |
| EP | 0915 244 A2 | 5/1999 |
| WO | 90/03220 | 4/1990 |
| WO | 90/08249 | 7/1990 |
| WO | 91/01178 | 2/1991 |
| WO | 91/01807 | 2/1991 |
| WO | 97/49905 | 12/1997 |
| WO | 98/45586 | 10/1998 |
| WO | 99/20876 | 4/1999 |
| WO | 02/075125 A1 | 9/2002 |

* cited by examiner

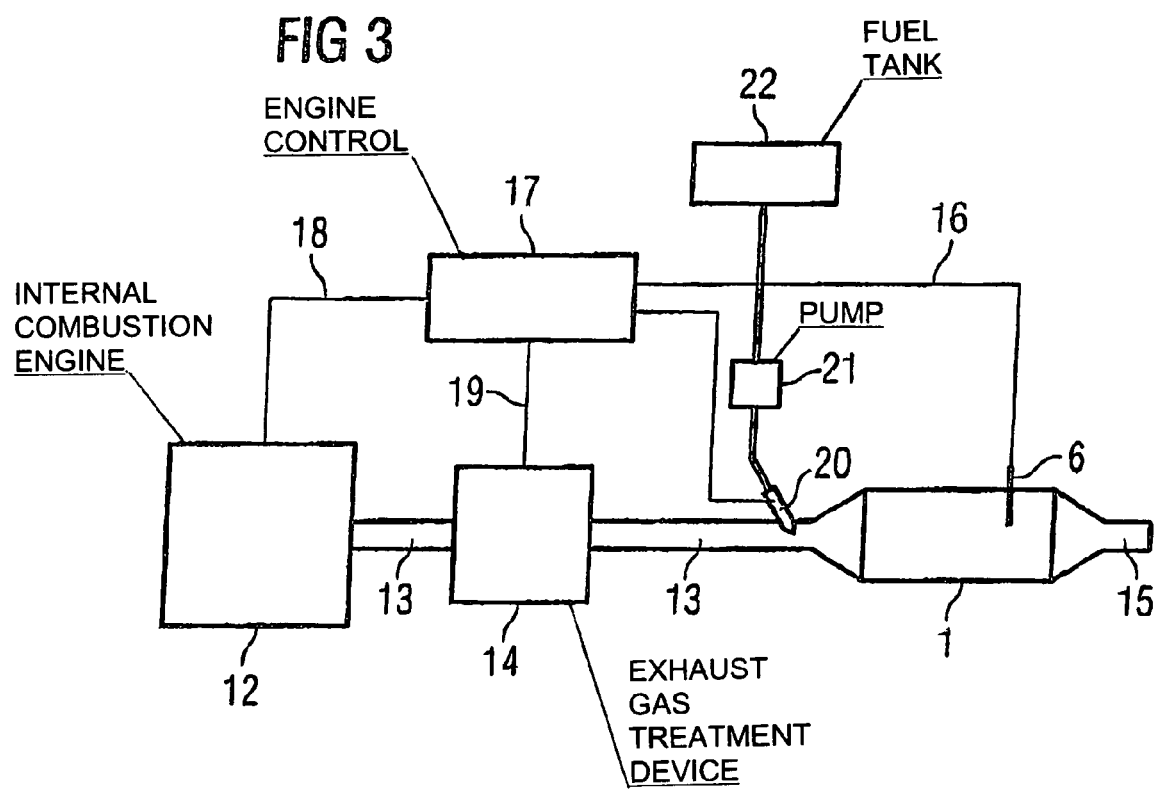

HONEYCOMB BODY AND METHOD FOR TREATING A FLUID

CROSS-REFERENCE TO RELATED APPLICATION

This is a continuing application, under 35 U.S.C. § 120, of copending International Application No. PCT/EP2003/013746, filed Dec. 5, 2003, which designated the United States; this application also claims the priority, under 35 U.S.C. § 119, of German Patent Application 103 00 408.4, filed Jan. 9, 2003; the prior applications are herewith incorporated by reference in their entirety.

BACKGROUND OF THE INVENTION

Field of the Invention

The invention relates to a method for the treatment of a fluid, in particular for the aftertreatment of an exhaust gas from an internal combustion engine. The invention also relates to a honeycomb body, in particular for the aftertreatment of the exhaust gas from an internal combustion engine.

In recent years, increasingly stringent standards for the pollutant emission levels to be observed in exhaust gases from automobiles have been imposed throughout the world. In practice, it is only possible to comply with those standards by aftertreatment of the exhaust gas from the internal combustion engines of the automobiles. It has proven successful to use honeycomb bodies as catalyst carrier bodies for that purpose. Honeycomb bodies have cavities through or at least past which a fluid can flow and which form flow passages in the case of cavities through which the fluid can flow. Precious metal catalysts are, inter alia, applied to the surface of the cavities, leading to the undesirable constituents of the exhaust gas reacting at significantly lower reaction temperatures.

In general, there are two known types of honeycomb bodies, firstly ceramic monolithic honeycomb bodies and secondly metallic honeycomb bodies. A number of structures of such honeycomb bodies are known.

A distinction is drawn in particular between two typical structures of metallic honeycomb bodies. An early structure, of which German Published, Non-Prosecuted Patent Application DE 29 02 779 A1, corresponding to U.S. Pat. No. 4,273,681, shows typical examples, is the helical structure, in which substantially one smooth and one corrugated sheet-metal layer are placed on top of one another and wound up helically. In another embodiment, the honeycomb body is constructed from a multiplicity of alternately disposed smooth and corrugated or differently corrugated sheet-metal layers, in which case the sheet-metal layers initially form one or more stacks which are intertwined with one another. In that case, the ends of all of the sheet-metal layers come to lie on the outer side and can be joined to a housing or tubular casing, resulting in the formation of numerous joints, which increase the durability of the honeycomb body. Typical examples of those structures are described in European Patent EP 0 245 737 B1, corresponding to U.S. Pat. Nos. 4,832,998, 4,803,189, 4,946,822 and 4,923,109 or International Publication No. WO 90/03220, corresponding to U.S. Pat. Nos. 5,105,539 and 5,139,844. It has also long been known to equip the sheet-metal layers with additional structures in order to influence the flow and/or achieve cross-mixing between the individual flow passages. Typical examples of those configurations include International Publication No. WO 91/01178, corresponding to U.S. Pat. No. 5,403,559, International Publication No. WO 91/01807, corresponding to U.S. Pat. Nos. 5,045,403 and 5,130,208, and International Publication No. WO 90/08249, corresponding to U.S. Pat. No. 5,157,010. Finally, there are also honeycomb bodies in conical form, which also have further additional structures for influencing the flow, if appropriate. A honeycomb body of that type is described, for example, in International Publication No. WO 97/49905, corresponding to U.S. Pat. No. 6,190,784. Furthermore, it is known to leave a cutout for a sensor open in a honeycomb body, in particular for accommodating a lambda sensor. One such example is described in German Utility Model 88 16 154 U1.

Furthermore, it is known to provide a storage device for the reduction of disruptive components in the exhaust gas, for example of nitrogen oxides ($NO_x$). By way of example, it is known from International Publication No. WO 99/20876, corresponding to U.S. Pat. No. 6,854,263, to provide an $NO_x$ storage device, which is able to store the nitrogen oxides produced during operation for a certain period of time, in the exhaust system of a diesel or lean-burn engine. An $NO_x$ storage device of that type is regenerated before its storage capacity is exhausted by unburnt hydrocarbons being fed to the exhaust system. Those hydrocarbons react with the stored nitrogen oxides, if appropriate with the assistance of suitable catalysts, and the only products formed are carbon dioxide, nitrogen and water. Any excess hydrocarbons which are supplied or do not react with the nitrogen oxides are oxidized in the exhaust system with residual oxygen present in the exhaust gas, so that likewise only carbon dioxide and water are formed. That catalytic conversion can take place at a catalytically active coating of the $NO_x$ storage device itself or in a downstream oxidation catalytic converter. It is also known from European Patent EP 0 974 002 B1, corresponding to U.S. Pat. No. 6,519,930, to use a temperature sensor in the $NO_x$ storage device to draw conclusions as to, for example, the operating capacity, the operating state and/or the storage capacity of the $NO_x$ storage device during a regeneration of that type.

However, in honeycomb bodies with storage properties which are known from the prior art, there are no devices for preventing the component which is to be stored from breaking through the storage device. In other words, there are no devices to prevent the component that is to be stored from escaping from the honeycomb body, for example in the event of excessively long storage times.

SUMMARY OF THE INVENTION

It is accordingly an object of the invention to provide a honeycomb body for the treatment of a fluid and a corresponding method, which overcome the hereinafore-mentioned disadvantages of the heretofore-known devices and methods of this general type and which are very reliably able to prevent components to be stored from breaking through.

With the foregoing and other objects in view there is provided, in accordance with the invention, a honeycomb body, in particular for the aftertreatment of exhaust gas from an internal combustion engine. The honeycomb body comprises an inlet surface, an outlet surface and a honeycomb structure through which a fluid can flow. The honeycomb structure is disposed between the inlet surface and the outlet surface.

The honeycomb structure has a storage device for storing at least one component of the fluid. A measurement sensor measures a concentration of the component in the fluid. The measurement sensor is disposed in the honeycomb structure at a given minimum distance from the outlet surface.

A honeycomb body according to the invention is highly advantageous in particular if the honeycomb body according to the invention is used as the final element of the exhaust-gas treatment at the exhaust section of an internal combustion engine. That is because in this case, breaking through of the component to be stored would lead directly to the component to be stored being emitted into the environment. In addition to increasing environmental pollution, this would mean in some cases that statutory limits would not be complied with.

It is particularly advantageous if nitrogen oxides ($NO_x$) can be stored in the honeycomb body. Placing the measurement sensor within the honeycomb body has the advantage that when the measurement sensor measures a certain concentration of the component that is to be stored, this concentration is still within the honeycomb structure and not downstream thereof, as would be the case if the measurement sensor were to be provided downstream of the honeycomb body, as seen in the direction of flow.

In accordance with another feature of the invention, the given minimum distance is such that when the measurement sensor responds to the presence of a predeterminable maximum concentration of the component in the fluid, this maximum concentration has not yet reached the outlet surface at any location of the honeycomb structure.

Since regions with different flow velocities of the fluid in the honeycomb body are formed over the cross section of the honeycomb structure, it is thus advantageously possible, for example, to determine the concentration of the component in the fluid at the edge of the honeycomb structure and to use this information to draw conclusions, based on the known flow conditions in the honeycomb body or within the honeycomb structure, as to the extent to which this maximum concentration has already advanced in the regions where the flow velocity is highest. It is thus advantageously possible to prevent the component that is to be stored from breaking through the honeycomb body.

By way of example, it is possible for the fluid to flow through radially outer passages in the honeycomb body at a slower velocity than in radially central flow passages. This would lead to a higher throughput of fluid per unit time in the radially inner region of the honeycomb body, with the result that the storage device in the central passages of the honeycomb body would be filled up more quickly than the storage device at the edge of the honeycomb body. These storage devices may, for example, be an adsorbent coating, at which the particles to be stored are bound by physisorption or chemisorption. If the concentration of the component to be stored in the fluid is then determined, and if this concentration corresponds to a predeterminable maximum concentration, it can be concluded that the storage capacity in the radial region in which the measurement sensor is provided has been exhausted all the way up to the measurement sensor. It is then possible to determine the progress of the concentration front from the known flow conditions. This can be done, for example, by calculation, for example in an engine control unit of the internal combustion engine.

In accordance with a further feature of the invention, the given minimum distance is such that when the measurement sensor responds to the presence of a predeterminable maximum concentration of the component in the fluid, the storage volume between the sensor and the outlet surface is sufficient to continue to store the component until measures for regenerating the storage device become effective without this maximum concentration reaching the outlet surface at any location in the honeycomb structure.

It is particularly advantageous for the given minimum distance to be such that it is not necessary for a predeterminable measure for regenerating the storage device to be carried out immediately after the measurement sensor responds. Otherwise, if a honeycomb body of this type is used in a motor vehicle, it may be necessary to carry out a regeneration measure even though such a measure is only possible at the expense of lowered safety for the user of the motor vehicle during the instantaneous driving situation, for example when passing another vehicle. On the other hand, if the given minimum distance is such that the remaining storage device which has not yet been filled up downstream of the measurement sensor represents a buffer for a certain period of time, it is advantageously possible to select a time to initiate the regeneration measures which does not involve any loss of safety or comfort for the user.

Unlike in the known method of calculating a certain size of the storage device and regenerating it at regular, defined intervals of time, with a honeycomb body according to the invention it is advantageously possible to make the storage device as small as possible but as large as necessary to prevent the component that is to be stored from breaking through. Overall, on one hand, this leads to smaller storage devices or smaller honeycomb bodies being formed, and therefore reduces the production costs of the component. On the other hand, unnecessarily frequent regeneration for a predetermined storage volume can be avoided.

In accordance with an added feature of the invention, there is provided a device for determining at least one further characteristic variable of the fluid. In this context, it is particularly advantageous to provide a device for determining the residual oxygen content of the fluid and/or the temperature of the fluid.

The data obtained by such a device can advantageously be used during control both, for example, of the regeneration of the storage device in a honeycomb body according to the invention and of other parts, for example of the exhaust system of an internal combustion engine. The data obtained in this way can also be used to actuate the engine as part of engine control. It is advantageous to provide a device for determining the temperature of the fluid in particular if a rise in the temperature of the honeycomb body is expected, for example, as part of the regeneration measures. A rise in the temperature of the honeycomb body leads to the fluid flowing through it being heated up, and vice versa. Consequently, it is possible to draw conclusions as to the temperature of the honeycomb body by determining the temperature of the fluid, inter alia. If appropriate, the regeneration measures carried out can be terminated if a predeterminable maximum temperature is reached.

This is particularly advantageous if desulfating also takes plate as part of the regeneration. The sulfur content in the fuel leads to the formation of sulfates during the combustion. If nitrogen oxides are stored, the sulfates block the storage capacity required for the storage of nitrogen oxides. However, a significantly higher temperature, which is well above the regeneration temperature for nitrogen oxides, is required for regeneration if sulfates have accumulated in the storage device. This means that if a regeneration step is also intended for desulfating of the honeycomb body according to the invention, significantly higher temperatures have to be accepted. However, in order to prevent thermal damage to the honeycomb body during desulfating, a regeneration measure is terminated when a predeterminable maximum temperature is reached.

In accordance with an additional feature of the invention, there is provided a storage device for storing nitrogen oxides ($NO_x$). In many countries, statutory regulations regulate the levels of nitrogen oxides in the exhaust gas emitted. Consequently, a honeycomb body according to the invention with a storage device for storing nitrogen oxides in the exhaust section of an internal combustion engine effectively lowers the levels of the nitrogen oxides in the exhaust gas, which means that the statutory limits are reliably complied with.

When nitrogen oxides are being stored, the injection of unburnt hydrocarbons leads to the stored nitrogen oxides being burnt off and to the storage device being regenerated as a result. The reaction products of this regeneration reaction are carbon dioxide, nitrogen and water. When used in the exhaust system of an internal combustion engine, it is advantageously possible to inject unburnt fuel.

With the objects of the invention in view, there is also provided a method for the treatment of a fluid, in particular an aftertreatment of exhaust gas from an internal combustion engine. The method comprises providing a honeycomb body having an inlet surface, an outlet surface and a honeycomb structure through which the fluid can flow. The honeycomb structure is disposed between the inlet surface and the outlet surface, and the honeycomb structure has a storage device for storing at least one component of the fluid. A concentration of the component to be stored in the fluid is determined in the honeycomb structure at a given minimum distance from the outlet surface.

In accordance with another mode of the invention, the given minimum distance is such that when a predeterminable maximum concentration of the component is exceeded in the fluid, this maximum concentration has not yet reached the outlet surface at any location of the honeycomb structure. This advantageously makes it possible to prevent the component of the exhaust gas which is to be stored from breaking through the honeycomb body.

In accordance with a further mode of the invention, the given minimum distance is such that when a predeterminable maximum concentration of the component is exceeded, the storage volume between the position in the honeycomb structure at which the concentration of the component to be stored is determined and the outlet surface is sufficient to continue to store the component until measures for regenerating of the storage device become effective, without the maximum concentration reaching the outlet surface at any location of the honeycomb structure.

Therefore, by suitably presetting the maximum concentration, it is advantageously possible not only to prevent the general breakthrough of the component, but also to allow the component to continue to be stored in the remaining storage volume for a certain period of time without it being necessary to initiate a regeneration measure for regenerating the storage device immediately. This advantageously allows the storage device to be regenerated when a suitable situation arises.

In accordance with an added mode of the invention, at least one further characteristic variable of the fluid is additionally determined. In this context, it is particularly advantageous to determine the oxygen concentration and/or the temperature of the fluid.

It is thus advantageously possible to link the control of the regeneration properties of the honeycomb body to the control of other parts of the exhaust device of an internal combustion engine and/or of the internal combustion engine itself. This allows optimum operation of the individual components in each case.

In accordance with an additional mode of the invention, measures for regenerating the storage device are carried out as soon as the predeterminable maximum concentration of the components to be stored has been reached. This allows very rapid regeneration of the storage device.

In accordance with yet another mode of the invention, measures for regenerating the storage device are carried out at the latest as soon as a predeterminable period of time has elapsed after the predeterminable maximum concentration has been reached.

This advantageously allows the remaining storage volume to be used as a type of buffer. It is therefore possible for the regeneration measures to be carried out at a time at which neither comfort nor safety of the user of a motor vehicle is adversely affected by these measures. Furthermore, it is possible to provide a maximum period of time after which a regeneration measure must be carried out. This prevents the component of the fluid that is to be stored from breaking through the honeycomb body. This maximum period of time can advantageously be defined by taking into account the storage volume between the position at which the concentration of the component of the fluid to be stored is determined and the outlet surface.

In accordance with yet a further mode of the invention, nitrogen oxides ($NO_x$) are stored. In particular, if a honeycomb body with a storage device for storing nitrogen oxides is used as the final element of the exhaust-gas aftertreatment of a motor vehicle, it is advantageous for no nitrogen oxides whatsoever to break through this honeycomb body, since they would then be emitted directly into the environment.

In accordance with yet an added mode of the invention, unburnt hydrocarbons are introduced into the honeycomb structure as a measure for regenerating the storage device. In the case of honeycomb bodies with a device for storing $NO_x$, this leads to the $NO_x$ burning off. This reaction produces carbon dioxide, nitrogen and water.

In accordance with a concomitant mode of the invention, the measures for regenerating the storage device are terminated if the exhaust-gas temperature exceeds a predeterminable maximum temperature. This advantageously makes it possible to prevent the honeycomb body from being damaged, since the regeneration measures can be ended at a sufficiently early stage for there to be no thermal damage to the honeycomb body.

All of the advantages and statements which have been listed above in connection with a honeycomb body according to the invention, equally constitute advantageous aspects of the method, and vice versa.

Other features which are considered as characteristic for the invention are set forth in the appended claims.

Although the invention is illustrated and described herein as embodied in a honeycomb body and a method for treating a fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a block diagram of an internal combustion engine with an exhaust section and a side-elevational view of a honeycomb body according to the invention.

DESCRIPTION OF THE PREFERRED EMBODIMENTS

Figure 1:
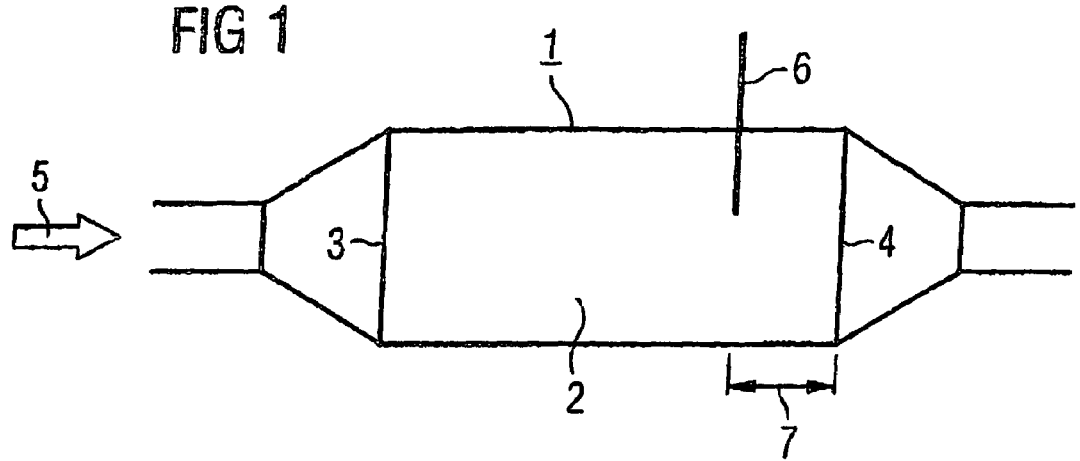
FIG. 1 is a diagrammatic, side-elevational view of a honeycomb body according to the invention.

Referring now to the figures of the drawings in detail and first, particularly, to FIG. 1 thereof, there is seen a diagrammatic illustration of a honeycomb body 1 according to the invention with a honeycomb structure 2, which has an inlet surface 3 and an outlet surface 4. When this honeycomb body is installed in the exhaust section of an internal combustion engine, a gas stream 5 enters the honeycomb structure 2 through the inlet surface 3 and leaves it through the outlet surface 4. For this purpose, the honeycomb structure 2 has passages through which a fluid can flow from the inlet surface 3 to the outlet surface 4. Inner surfaces of the honeycomb structure 2 may be coated. The coating may contain precious metal catalysts which are used to convert parts of the exhaust gas from the internal combustion engine. Furthermore, the honeycomb structure 2 has a storage device for storing at least one component, such as for example nitrogen oxides ($No_x$). The storage device may be in the form of an adsorbent coating which covers the inner surfaces of the honeycomb structure 2.

Figure 2:
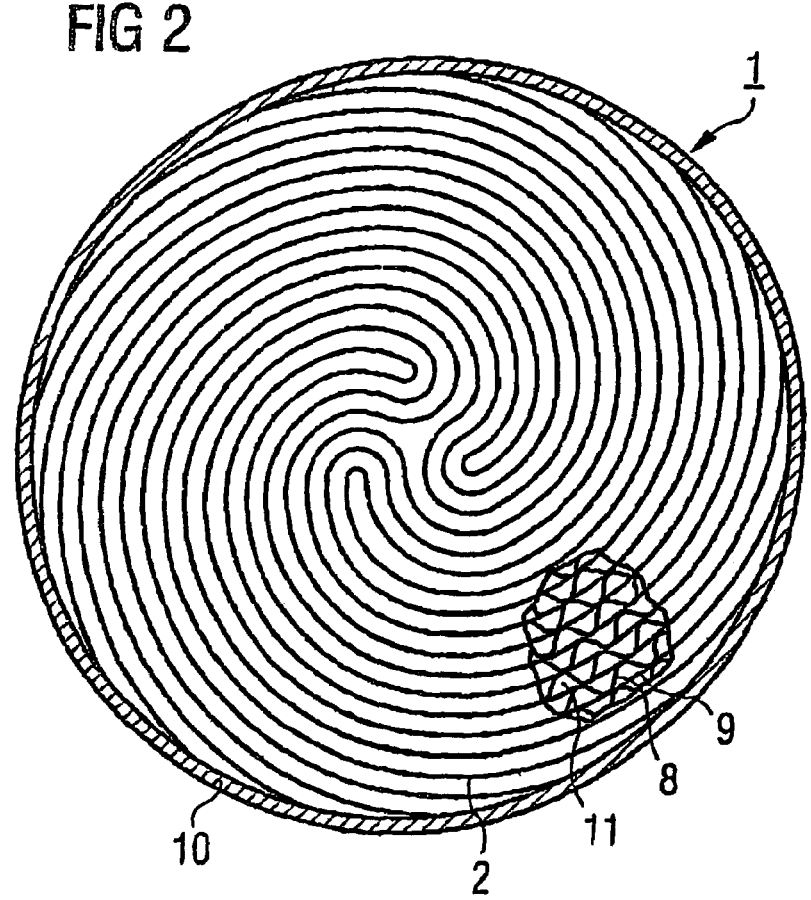
FIG. 2 is an enlarged, partly-sectional, end-elevational view of a honeycomb body according to the invention.

The honeycomb structure 2 has a multiplicity of cavities or passages which the gas can at least flow past and may be constructed as a ceramic monolithic honeycomb structure or as a metallic honeycomb structure. FIG. 2 shows a view of an example of a metallic honeycomb body 1 from an end side. The exemplary embodiment shown in that figure has been produced by winding together three stacks of sheet-metal layers. Each of these stacks has been formed by alternately stacking structured sheet-metal layers 8 and substantially smooth sheet-metal layers 9, which are connected to one another by suitable technical joining processes, for example brazing or welding or sintering, at least in axial and/or radial subregions of the honeycomb structure 2. The spaces between the sheet-metal layers 8, 9 form passages 11. For the sake of clarity, the structures of the structured sheet-metal layers 8 are only shown in part of the end-side view of the honeycomb structure. The honeycomb structure is secured in a tubular casing 10 and thus forms the honeycomb body 1.

The sheet-metal layers 8, 9 may be thin sheet-steel layers with a thickness of less than 80 µm, preferably less than 40 µm, and particularly preferably less than 20 µm. However, it is equally possible for the structured sheet-metal layers 8 and/or the substantially smooth sheet-metal layers 9 to be formed from a material which a fluid can at least partially flow through. This makes it possible to construct an open particulate filter, in which the gas stream partially passes through the structured sheet-metal layers 8 or the substantially smooth sheet-metal layers 9. The proportion of the gas stream which passes through these layers can be increased by forming structures which swirl up the gas stream, so that pressure differences enable the gas stream to flow through the walls. In the process, particulates that are to be filtered out collect in the wall.

A particulate filter is described as being open if in principle all particles can pass through it, even particles which are considerably larger than the particulates that are actually to be filtered out. As a result, a filter of this type cannot become blocked during operation even in the event of an agglomeration of particles. An example of a suitable method for measuring the openness of a particulate filter is to test up to what diameter of spherical particles can still pass through a filter of this type. In present applications, a filter is open in particular if spherical particles with a diameter of greater than or equal to 0.1 mm can still pass through it, preferably spherical particles with a diameter of over 0.2 mm.

Furthermore, it is also possible for at least some of the structured sheet-metal layers 8 or of the substantially smooth sheet-metal layers 9 to be constructed with holes, the dimensions of which are significantly larger than the structure repeat length of the structures used in the structured sheet-metal layers 8. This leads to particularly intimate mixing and to more uniform conversion of the exhaust gas.

As is shown in FIG. 1, the honeycomb body 1 according to the invention also has a measurement sensor 6 which is disposed in the honeycomb structure 2 at a certain given minimum distance 7 from the outlet surface 4. The measurement sensor 6 is sensitive to the component of the exhaust gas which is to be stored in the storage device. If this component is $NO_x$, the measurement sensor 6 will determine that there is no $NO_x$ or only a very low concentration of $NO_x$ in the exhaust gas for as long as the storage device of the honeycomb structure 2 (which is located upstream in terms of the flow of gas 5) still has a sufficient unoccupied storage volume.

It is preferable for the given minimum distance 7 to be such that when the measurement sensor records a predeterminable maximum concentration of the component in the exhaust gas, this predeterminable maximum concentration of the component has not yet reached the outlet surface 4 at any location of the honeycomb structure 2. In this context, when defining the given minimum distance 7, it is necessary to bear in mind that the exhaust gas passes through the cavities of the honeycomb structure 2 at different speeds. This means that concentration fronts may form, i.e. fronts with an identical concentration of the component that is to be stored, with these fronts advancing through the honeycomb body 1 over the course of time.

If a predeterminable maximum concentration of $NO_x$ is considered, for example in the case of a new honeycomb body 1, a concentration front with this maximum concentration will build up after a certain time. It will take a certain amount of time for this concentration front to build up, since at the start, the concentration of the $NO_x$ in the exhaust gas will very quickly drop to zero, at least in radial subregions of the honeycomb body, immediately after it enters the honeycomb body 1, since as yet no $NO_x$ has accumulated at the storage device. Therefore, virtually all of the $NO_x$ contained in the gas stream 5 at this time is stored immediately. The storage device is gradually filled with $NO_x$ in the direction of the flow of gas 5, so that a concentration front is formed, moving from the direction of the inlet surface 3 toward the outlet surface 4. This front does not have to constitute a flat plane, but rather it is generally curved or even fragmented. When this concentration front reaches the measurement sensor, this means that although the measurement sensor 6 is detecting the maximum concentration, there are locations in the honeycomb body at which this maximum concentration is significantly closer to the inlet surface 3 or closer to the outlet surface 4 than to the position of the measurement sensor 6. The given minimum distance 7 between the measurement sensor 6 and the outlet surface 4 is therefore selected in such a way that under normal operating conditions it is impossible for $NO_x$ to break through. This means that no $NO_x$ should escape from the outlet surface 4 of the honeycomb structure 2.

It is particularly advantageous for the given minimum distance 7 between the measurement sensor 6 and the outlet surface 4 of the honeycomb structure 2 to be selected in such a way that the storage volume downstream of the measurement sensor 6 is sufficient, even for the fastest regions of the concentration front, to ensure the storage of $NO_x$ for a certain period of time, in order thereby to prevent $NO_x$ from breaking through. This makes it possible for any regeneration step, which may be carried out, for example, by injecting unburnt hydrocarbons and which leads to conversion of the $NO_x$ and therefore to an increase in the storage volume available, to be carried out at a time which can be adapted to the operating conditions of the internal combustion engine.

Furthermore, at least one device for determining at least one further characteristic variable of the fluid may also be provided. In that context, it is also possible for a lambda sensor and/or a temperature sensor to be integrated in the measurement sensor 6. This advantageously makes it possible, when carrying out measures for regenerating the storage device, to determine whether or not unburnt hydrocarbons would pass through the outlet surface of the honeycomb structure 2 and would thus enter the environment. Moreover, it is possible to prevent thermal damage to the honeycomb body 1 by terminating the regeneration measure if a predeterminable maximum temperature is reached. This is important in particular when desulfating the honeycomb body 1.

FIG. 3 diagrammatically depicts an internal combustion engine 12 of a motor vehicle with an exhaust pipe 13, an engine control 17 and a honeycomb body 1 according to the invention. Exhaust gases produced by the engine 12 are fed into the exhaust pipe 13. The exhaust gases pass through an exhaust-gas treatment device 14. The device 14 may, for example, be a standard three-way catalytic converter. A honeycomb body 1 according to the invention, in which there is a storage device for storing $NO_x$, is provided in the exhaust pipe 13 downstream of the exhaust-gas treatment device 14. A tailpipe 15, through which the exhaust gases are released to the environment, is located downstream of the honeycomb body 1 according to the invention. A measurement sensor 6 is provided in the honeycomb body 1. This measurement sensor 6 determines the $NO_x$ concentration in the exhaust gas and also includes a lambda sensor and a temperature sensor. Data obtained by the measurement sensor 6 are transmitted to the engine control 17 through a first signal line 16. The engine control 17 is connected to the engine 12 through a second signal line 18. Furthermore, a third signal line 19 connects the engine control 17 to the exhaust-gas treatment device 14. Therefore, the data obtained in the exhaust-gas treatment device 14, in the honeycomb body 1 and in the engine 12 can advantageously be processed by the engine control 17 and used to control an injection device 20. The injection device 20 may be constructed, for example as a nozzle which is supplied with pressurized, unburnt fuel from a tank 22, for example through a pump 21. It is possible to introduce very accurately determined quantities of unburnt fuel into the exhaust pipe 13 in order to regenerate the storage device in the honeycomb body 1, by controlling opening times of the injection device 20, which may be constructed, for example, as an electromechanical valve. As soon as the measurement sensor 6 indicates that the temperature of the exhaust gas and therefore also of the honeycomb body 1 has exceeded a predetermined maximum temperature, or the lambda sensor in the measurement sensor 6 detects unburnt hydrocarbons in a concentration which indicates that hydrocarbons are on the verge of breaking through, the regeneration measure, i.e. the injection of unburnt fuel, can be rapidly terminated by the injection device 20. On one hand, this prevents unburnt hydrocarbons from being released to the atmosphere and on the other hand, prevents thermal damage to the honeycomb body 1.

A honeycomb body according to the invention and a method according to the invention for the treatment of a fluid, in particular for the aftertreatment of an exhaust gas from an internal combustion engine, advantageously allow the storage of components of a fluid, for example of $NO_x$. The storage device required can have a small construction, yet it is nevertheless effectively and reliably possible to prevent the component that is to be stored from breaking through the honeycomb body.

I claim:

1. A method for the treatment of a fluid in an exhaust gas treatment system having an exhaust gas flow direction, which comprises the following steps:
    producing the exhaust gas with an engine;
    introducing a regenerating substance with an injection device;
    controlling the engine and the injection device with an engine control;
    providing a honeycomb body disposed last in the exhaust gas flow direction through the system, the honeycomb body having an inlet surface, an outlet surface and a honeycomb structure through which the fluid can flow, the honeycomb structure disposed between the inlet surface and the outlet surface, and the honeycomb structure having a storage device in the form of an adsorbent coating for storing at least one component of the fluid;
    regenerating the storage device with the injection device; and
    determining a concentration of at least nitrogen oxides in the component to be stored in the fluid in the honeycomb structure at a given minimum distance from the outlet surface to prevent a breakthrough of at least nitrogen oxides in the component.

2. The method according to claim 1, wherein the honeycomb structure carries out an aftertreatment of exhaust gas from an internal combustion engine.

3. The method according to claim 1, wherein the given minimum distance is such that when a predeterminable maximum concentration of the component is exceeded in the fluid, the maximum concentration has not yet reached the outlet surface at any location of the honeycomb structure.

4. The method according to claim 1, wherein the given minimum distance is such that when a predeterminable maximum concentration of the component is exceeded, a storage volume between a position in the honeycomb structure at which the concentration of the component to be stored is determined and the outlet surface is sufficient to continue to store the component until measures for regenerating the storage device become effective without the maximum concentration reaching the outlet surface at any location of the honeycomb structure.

5. The method according to claim 1, which further comprises carrying out measures for regenerating the storage device as soon as a predeterminable maximum concentration of the component to be stored has been reached.

6. The method according to claim 1, which further comprises carrying out measures for regenerating the storage device as soon as a predeterminable period of time has elapsed after a predeterminable maximum concentration has been reached.

7. The method according to claim 2, which further comprises:
    carrying out measures for regenerating the storage device;
    additionally determining a temperature of the exhaust gas; and
    terminating the measures for regenerating the storage device if the exhaust-gas temperature exceeds a predeterminable maximum temperature.

8. The method according to claim 1, wherein the honeycomb body has a diameter, and the given minimum distance is less than the diameter.

9. The method according to claim 1, wherein the storage device stores nitrogen oxides.

10. The method according to claim 9, which further comprises introducing unburnt hydrocarbons into the honeycomb structure as a measure for regenerating the storage device.

11. The method according to claim 1, which further comprises additionally determining at least one further characteristic variable of the fluid.

12. The method according to claim 11, which further comprises carrying out the step of additionally determining at least one further characteristic variable of the fluid by additionally determining oxygen concentration in the fluid.

13. The method according to claim 11, which further comprises carrying out the step of additionally determining at least one further characteristic variable of the fluid by additionally determining temperature of the fluid.

14. An exhaust gas treatment system having an exhaust gas flow direction, the system comprising:
an engine producing the exhaust gas;
an injection device for introducing a regenerating substance;
an engine control for controlling said engine and said injection device; and
a honeycomb body disposed last in the exhaust gas flow direction through the system, said honeycomb body having an inlet surface, an outlet surface, a honeycomb structure through which a fluid can flow, said honeycomb structure disposed between said inlet surface and said outlet surface, said honeycomb structure having a storage device in the form of an adsorbent coating for storing at least one component of the fluid, said storage device being regenerated by said injection device, and a measurement sensor for measuring a concentration of the component in the fluid and for determining a concentration of at least nitrogen oxides in the component, said measurement sensor disposed in said honeycomb structure at a given minimum distance from said outlet surface to prevent a breakthrough of at least nitrogen oxides in the component.

15. The exhaust gas treatment system according to claim 14, wherein said honeycomb structure provides aftertreatment of exhaust gas from an internal combustion engine.

16. The exhaust gas treatment system according to claim 14, wherein said given minimum distance is such that when said measurement sensor responds to a presence of a predeterminable maximum concentration of the component in the fluid, the maximum concentration has not yet reached said outlet surface at any location of said honeycomb structure.

17. The exhaust gas treatment system according to claim 14, wherein said given minimum distance is such that when said measurement sensor responds to a presence of a predeterminable maximum concentration of the component in the fluid, a storage volume between said measurement sensor and said outlet surface is sufficient to continue to store the component until measures for regenerating said storage device become effective without the maximum concentration reaching said outlet surface at any location in said honeycomb structure.

18. The exhaust gas treatment system according to claim 14, wherein said storage device for storing at least one component of the fluid is a storage device for storing nitrogen oxides.

19. The exhaust gas treatment system according to claim 14, which further comprises at least one device for determining at least one further characteristic variable of the fluid.

20. The honeycomb body exhaust gas treatment system according to claim 19, wherein said at least one device for determining at least one further characteristic variable of the fluid is a device for determining a residual oxygen content of the fluid.

21. The exhaust gas treatment system according to claim 19, wherein said at least one device for determining at least one further characteristic variable of the fluid is a device for determining temperature of the fluid.

22. The exhaust gas treatment system according to claim 19, wherein said honeycomb body has a diameter, and said given minimum distance is less than said diameter.

* * * * *